(12) United States Patent
Parein

(10) Patent No.: US 6,301,747 B1
(45) Date of Patent: Oct. 16, 2001

(54) RESILIENT HINGE CONNECTION AND CD HOLDER BOX OR PHOTOGRAPH FRAME UTILIZING THE SAME

(76) Inventor: Eric Parein, Boomsesteenweg 259, Bus8, Antwerpen (BE), 2020

( * ) Notice: Subject to any disclaimer, the term of this patent is extended or adjusted under 35 U.S.C. 154(b) by 0 days.

(21) Appl. No.: 09/331,896

(22) PCT Filed: Jan. 6, 1998

(86) PCT No.: PCT/BE98/00001

§ 371 Date: Jul. 6, 1999

§ 102(e) Date: Jul. 6, 1999

(87) PCT Pub. No.: WO98/30808

PCT Pub. Date: Jul. 16, 1998

(30) Foreign Application Priority Data

Jan. 6, 1997 (BE) .................................................. 09700006

(51) Int. Cl.[7] ............................... E05D 7/10; A63H 33/06
(52) U.S. Cl. ................................. 16/260; 16/386; 16/387; 446/120
(58) Field of Search ............................... 16/260, 266, 228, 16/386, 387; 40/779, 781; 206/308.1; 210/4.23, 840; 446/120, 121, 122, 127, 128; 312/326, 327, 328, 329

(56) References Cited

U.S. PATENT DOCUMENTS

| | | | |
|---|---|---|---|
| 3,497,908 | 3/1970 | Zamarra | ................................. 16/257 |
| 4,044,497 | * 8/1977 | Bettens | .............................. 446/120 X |
| 4,606,732 | * 8/1986 | Lyman | . |
| 4,615,445 | 10/1986 | Stocchiero | ......................... 206/308.3 |
| 4,731,903 | 3/1988 | Kennedy et al. | ....................... 16/224 |
| 4,756,053 | * 7/1988 | Madden et al. | ..................... 16/386 X |
| 4,793,480 | * 12/1988 | Gelardi et al. | ..................... 206/308.1 |
| 5,111,503 | * 5/1992 | Takagi | ................................. 16/260 X |
| 5,183,430 | * 2/1993 | Swann | . |
| 5,195,648 | * 3/1993 | Harris | ................................. 16/260 X |
| 5,209,693 | * 5/1993 | Lyman | ............................. 446/121 X |
| 5,590,767 | * 1/1997 | Li | ....................................... 206/308.1 |
| 5,887,373 | * 3/1999 | Byers | .................................. 40/781 X |
| 6,186,855 | * 2/2001 | Bauer | . |

FOREIGN PATENT DOCUMENTS

| | | |
|---|---|---|
| 0 109 181 | 5/1984 | (EP) . |
| 0 121 433 | 10/1984 | (EP) . |
| 0 682 964 | 11/1995 | (EP) . |
| 2 293 229 | 7/1976 | (FR) . |
| 2 534 484 | * 4/1984 | (FR) . |

* cited by examiner

Primary Examiner—Anthony Knight
(74) Attorney, Agent, or Firm—Jacobson Holman, PLLC

(57) ABSTRACT

A hinge connection including a male member applied on a base plate. The male member has protrusions provided to be hingedly and resiliently fitted between a pair of female members applied on a further base plate. The male member is formed by two parallel male legs. Each leg includes one of the protrusions and each of the female members includes a through hole for engaging one of the protrusions.

14 Claims, 8 Drawing Sheets

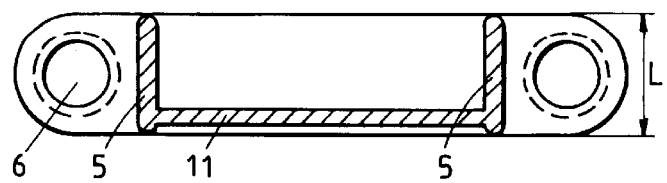
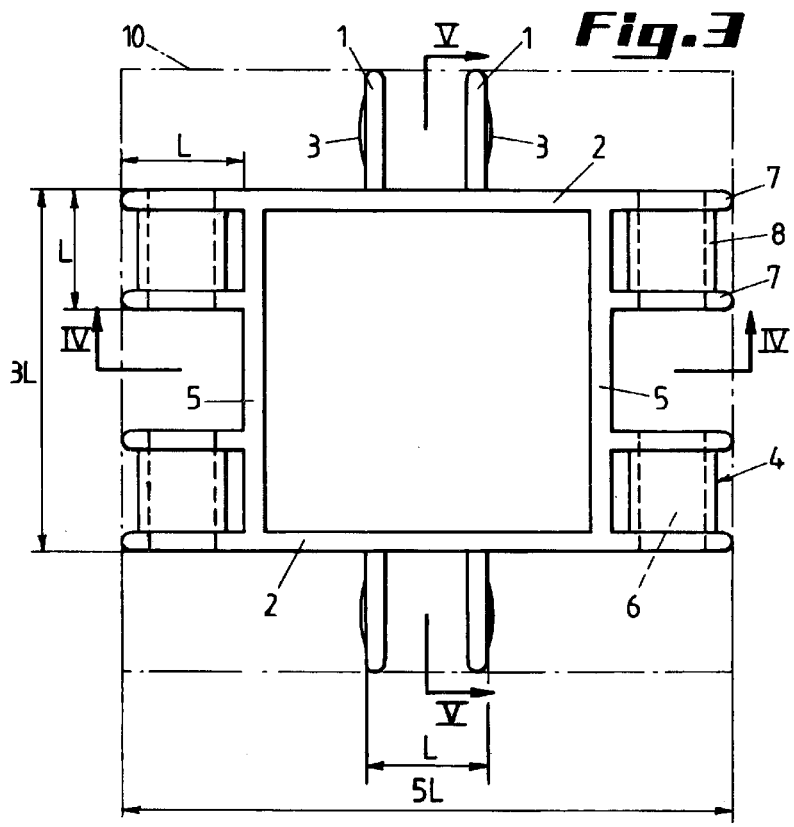
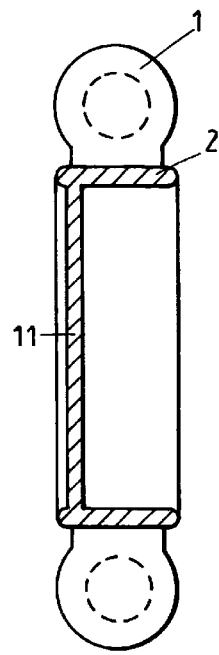
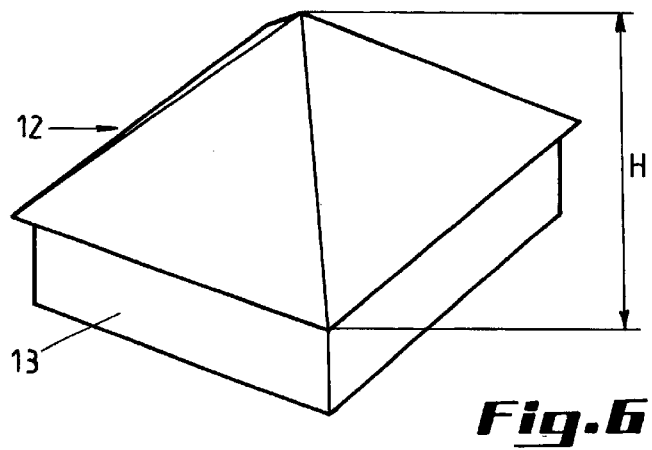

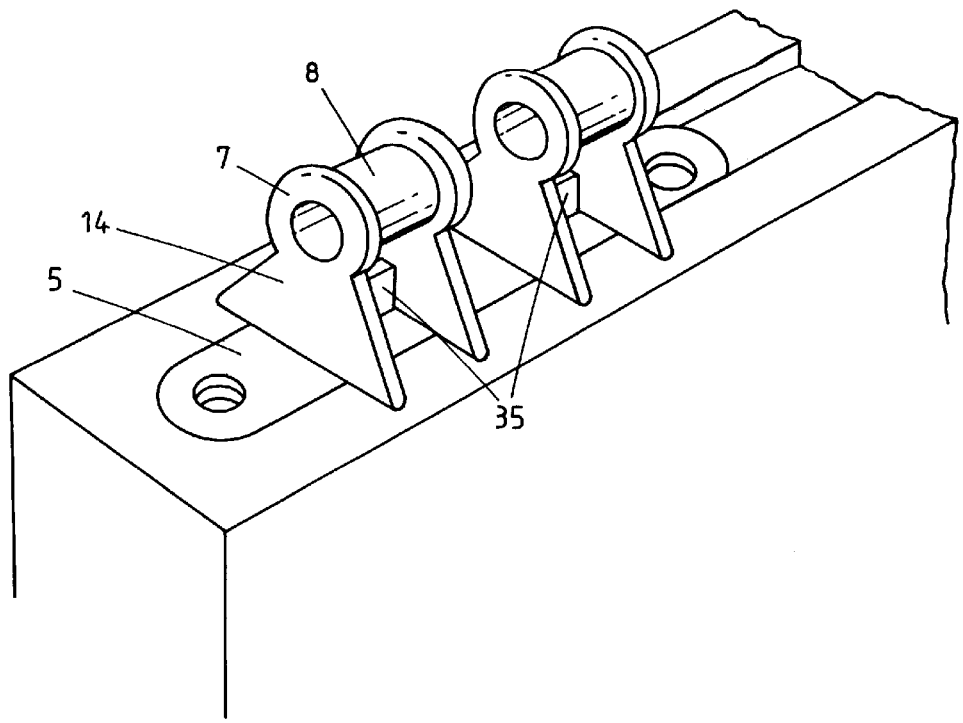
Fig.10
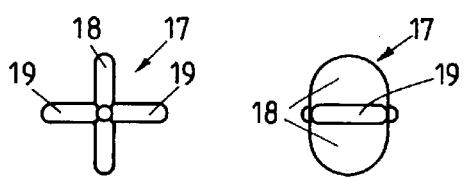
Fig.11  Fig.12
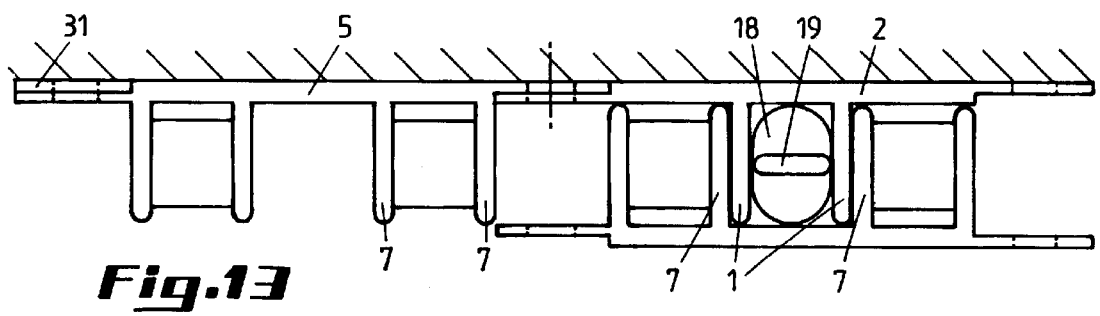
Fig.13
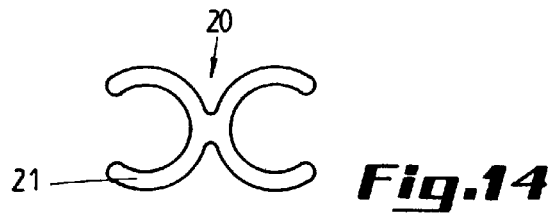
Fig.14

RESILIENT HINGE CONNECTION AND CD HOLDER BOX OR PHOTOGRAPH FRAME UTILIZING THE SAME

This is a National Stage of International Application No. PCT/BE98/00001, filed Jan. 6, 1998, which claims the benefit of Belgian Application No. 09700006, filed Jan 6, 1997.

FIELD OF THE INVENTION

The present invention relates to a hinge connection comprising a male member applied on a base plate, said male member having protrusions provided to be hingedly and resiliently fitted between a pair of female members applied on a further base plate.

BACKGROUND OF THE INVENTION

Such a hinge connection is known from FR-A-2 534 484 to Bersani wherein said male and female members are provided on construction elements. Both the male and female members are formed by cylindrical projections, wherein the male members comprise protrusions, fitting in corresponding excavations provided in the female members, or vice versa. The male and female members are thus plain cylinders with protrusions or excavations and are thus relatively thick. This thickness ensures a good stability of the hinge connection. Such a thickness is however inconvenient for manufacturing purposes, since upon moulding such a hinge connection, considerable cooling times are required for cooling the male and female members.

The problem of the invention is to provide a hinge connection having a reduced cooling time upon moulding but which still ensures a good stability of the connection.

SUMMARY OF THE INVENTION

This problem is solved by the hinge connection according to the invention which is characterised in that said male member is formed by two parallel male legs, wherein each leg comprises one of said protrusions, and that each of said female members comprises a through hole for engaging one of said protrusions.

The hinge connection is ensured by connecting the male legs with protrusions between the female members having through holes. The particular construction of the male and female members, i.e. two male legs and two female members having through holes, enables one to keep the thickness of the elements forming the hinge connection limited so that the cooling time may be kept relatively short.

In a first preferred embodiment of the hinge connection according to the invention, each of said female members is formed by two parallel female legs connected by an intermediary piece. Preferably, said intermediary pieces are mounted offset from said further base plate. This enables to further reduce the thickness of the female members and consequently to further reduce the cooling time upon moulding and still ensure the stability of the connection.

In order to improve the hinge movement of the hinge connection according to the invention, said intermediary pieces are cylindrical pieces and said through holes and protrusions are cylindrical. In addition or as an alternative, said male and female members are provided with rounded free ends.

Preferably, said legs comprise rounded borders. This facilitates the engagement or removal of the hinge connection.

For enabling one to use the hinge connection according to the invention for connecting relatively large plates, said legs comprise an enlarges base applied on said base plate, and respectively on said further base plate.

For enabling to use the hinge connection according to the invention for connecting relatively large plates, said legs comprise an enlarged base applied on said base plate, respectively further base plate.

The hinge connection according to the invention may further comprise a locking member for locking the connection of said male member to said female member, wherein said locking member comprises a locking leg provided to be placed between said male legs and a release leg extending essentially perpendicularly to said locking leg. This particular construction of locking member can easily be inserted manually between the male legs and removed by gripping the release leg with a pair of pincers.

The hinge connection according to the invention may further form a construction element comprising at least one base plate with at least one male member and at least one further base plate with at least one female member. This construction element may be used as a toy and enables one to create complex structures wherein planning and use of imagination is required. This contributes to the development of a child playing with those construction elements.

In particular, the construction element comprises at least three base plates forming a closed area, wherein said base plates are connected by a connection plate extending in a plane perpendicular to said base plates. This connection plate enhances the strength of the construction element and also enables one to form a container for receiving all kinds of objects or goods, for example sweets. The formed container may also be used as packaging.

In particular, the construction element comprises at least three base plates forming a closed area, wherein said base plates are connected by a connection plate extending in a plane perpendicular to said base plates. This connection plate enhances the strength of the construction element and enables also to form a container for receiving all kinds of objects or goods, for example sweets. The formed container may also be used as packaging.

A preferred embodiment of the construction element according to the invention comprises two parallel base plates and two further parallel base plates forming together a square, wherein the two base plates each comprise said male legs applied symmetrically with respect to the middle of the base plate and wherein the two further base plates each comprise said pair of female members, each female member of said pair extending at an extremity of the further base plate in such a manner that one of said female legs extends in prolongation from an extremity of one of said base plates. Preferably, the distance between the female legs is equal to L, the distance between the male legs is equal to L, the height of the legs is equal to L, the length of the base plates is equal to 3L and the height of the base plates is equal to L. This enhances the possibilities of forming complex structures by using several of such construction elements, since two construction elements of this type may be connected in four different ways to each other and each hinge connection provides a full 180 degrees positioning.

The present invention further relates to a tool provided for disconnecting a connection of a female from a male member, wherein said tool comprises two spaced apart lever legs, each lever leg being provided for being positioned between said two female legs for tilting said female member out of said male member.

BRIEF DESCRIPTION OF THE DRAWINGS

The invention will now be described further in detail referring to the annexed drawings. In the drawings, a same reference numeral has been attributed to a same or similar feature.

FIG. 3 is a plan view of a second preferred embodiment of a construction element with the male and female members according to the invention.

FIG. 4 is a section view taken along lines IV—IV from FIG. 3.

FIG. 5 is a section view taken along lines V—V from FIG. 3.

FIG. 6 is a perspective view of a pyramidal element with a squared base fitting in the construction element of FIGS. 3 to 5.

FIG. 10 shows a perspective view of the female members according to FIG. 9.

FIGS. 11 and 12 illustrate a locking member, provided for locking the connection of the male member with the female member of the hinge connection according to the invention.

FIG. 13 shows another embodiment of a hinge connection according to the invention with the locking member of FIGS. 11 and 12.

FIG. 14 illustrates a linking member for connecting intermediary pieces from two female members.

DETAILED DESCRIPTION OF THE PREFERRED EMBODIMENTS

Figure 1:
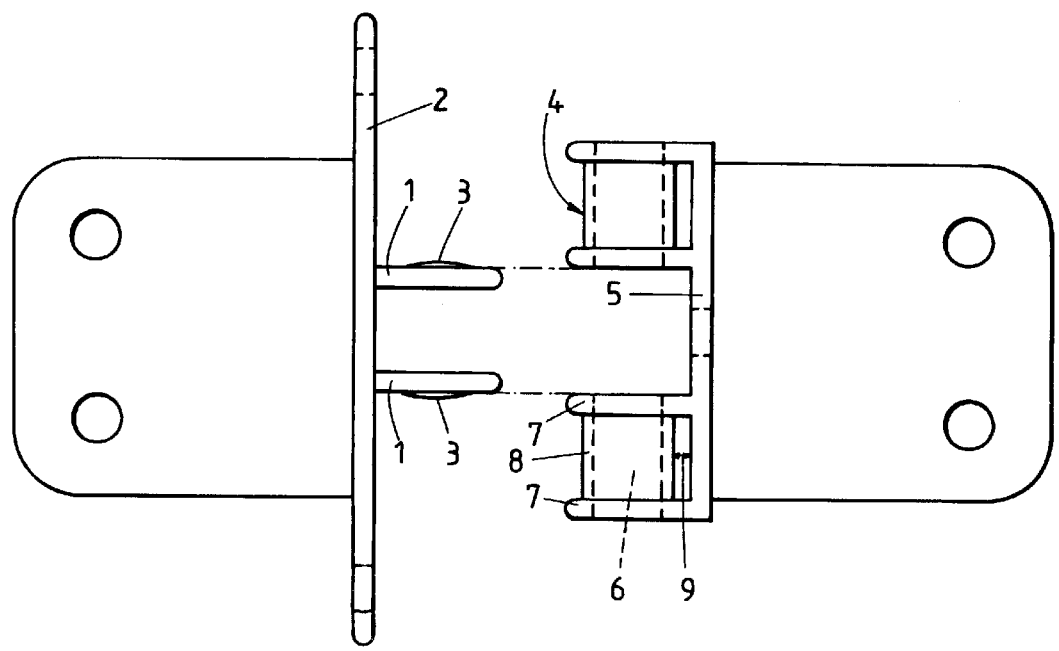
FIG. 1 is a plan view of a first preferred embodiment of the hinge connection according to the invention.

Referring to FIG. 1, there is shown a preferred embodiment of the hinge connection according to the invention. A male member formed by two parallel male legs 1 is applied on a base plate 2. Each of the male legs 1 comprise a protrusion 3. The hinge connection further comprises a pair of female members 4 applied on a further base plate 5, between which the male legs 1 with protrusions 3 may be hingedly and resiliently fitted.

According to the invention, each of the female members 4 comprise a through hole 6 for engaging one of the protrusions 3. By providing a male member having two legs and a pair of female members with a through hole, the thickness of the elements forming the hinge connection may be kept limited, so that upon moulding such a hinged connection, "hot spots" or amassment of material are avoided. Consequently, the cooling time of such a hinge connection may be relatively short. Providing a through hole 6 in the female members may easily be achieved upon moulding by inserting a rod having the same cross sectional shape as the hole to be applied. For moulding the hinge connection according to the invention, use is made of a plastic material, for example polypropylene or ABS.

FIG. 1 shows a preferred embodiment of the female members, wherein each of the female members is formed by two parallel female legs 7 connected by an intermediary piece 8, wherein the intermediary piece is mounted offset from said further base plate, as indicated by arrow 9 (FIG. 1). According to an alternative, each of the female members may be formed by one piece; in this case however, the through hole, instead of being cylindrical according to the shape of the intermediary piece, should have a shape corresponding to the shape of the female members, in particular a longitudinally extended shape with a rounded end (in cross section), in order to avoid "hot spots". This particular shape corresponds to the shape of the female legs illustrated in FIG. 4.

It should be noted that preference is given to rounded shape of the male and female members, as for example illustrated in FIGS. 4 and 5, enhancing in this way the hinge movement of the hinge connection. The connection of the elements is facilitated by providing legs with rounded free ends as for example clearly shown in FIGS. 1 and 3.

Figure 2:
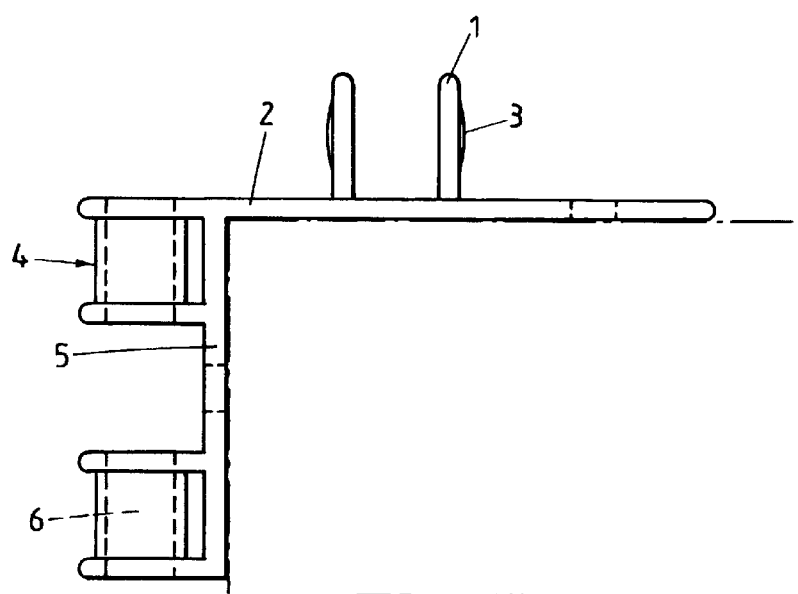
FIG. 2 is a plan view of a first preferred embodiment of a construction element with the male and female members according to the invention.

FIG. 2 illustrates a first preferred embodiment of a construction element according to the invention, comprising a base plate 2 and a further base plate 5 with male and female members as described hereinabove. This construction element may be for example used in a square plate wherein each corner of the plate is provided with such a construction element. In this way, different square plates, having the same dimension and provided with the construction elements according to FIG. 2, may be hingedly fixed together for forming complex structures.

Figure 19:
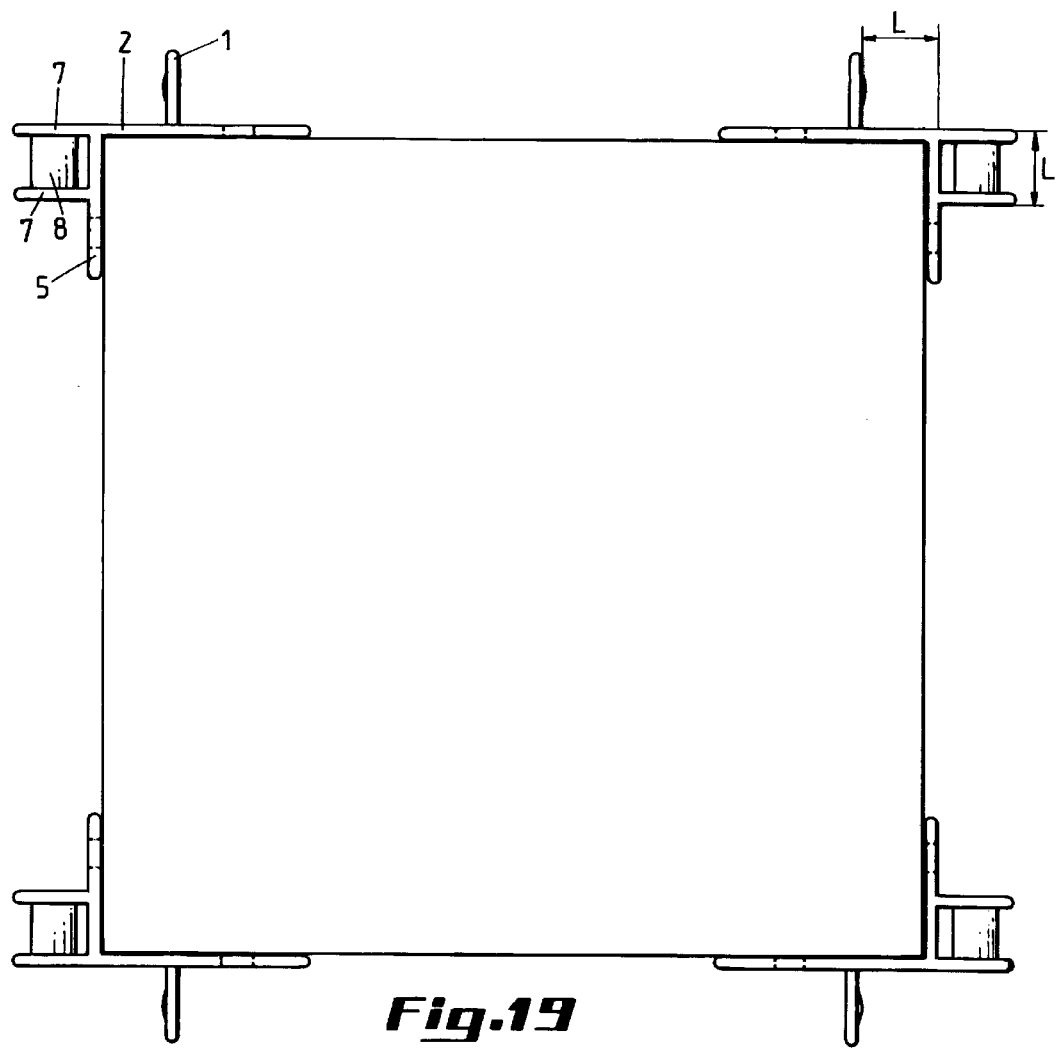
FIG. 19 is a plan view of a frame having hinge connections according to the invention.

FIG. 19 shows an alternative of FIG. 2, wherein only one male leg of the male member is applied on the base plate and only one of the pair of female members is applied on the further base plate. Providing such construction elements on a square plate enables also to form complex structures, wherein two male legs on one side of the square may be hingedly fitted between two female members, wherein each female member is located at a corner of the plate.

Referring now to FIGS. 3 to 5, there is shown a second preferred embodiment of the construction element according to the invention. According to this embodiment, there are two parallel base plates 2 with male legs 1 and two further parallel base plates 5 with female members 4. The base plates 2 and 5 are linked together in such a manner to form a square. As shown in FIG. 3, the male legs 1 are applied symmetrically with respect to the middle of the base plate 2 and each female member 4 extends at an extremity of the further base plate in such a manner that one of the female legs 7 extends in prolongation from an extremity of one of said base plates.

Figure 20:
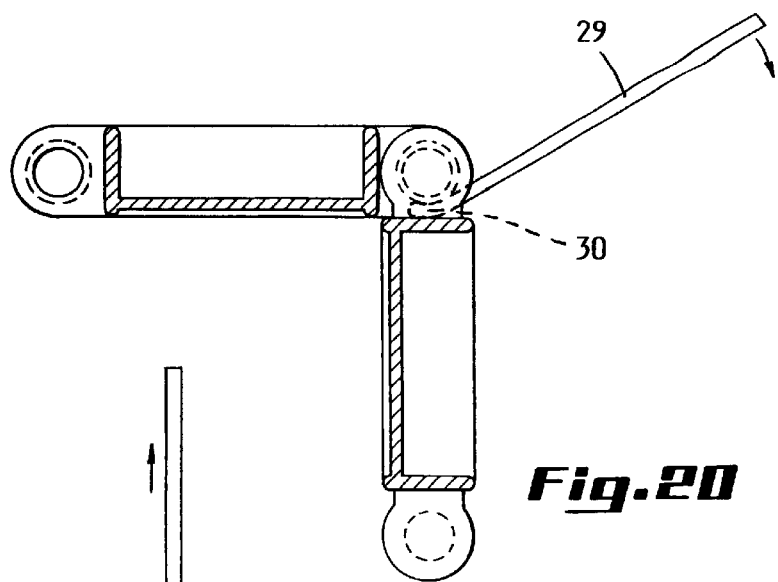
FIGS. 20 and 21 shows a first preferred embodiment of a tool provided for disengaging the hinge connection according to the invention.

As can be clearly deduced from FIGS. 3 to 5, two construction elements may be assembled by hingedly fitting the male legs from one construction element between the female members of another construction element, wherein the hinged connection may be rotated over 180°, forming an angle between 90 and 270 degrees with respect to each other. 90 and 270 degrees form two stop positions (one of which is shown in FIG. 20), since the female legs 7 from one construction element comes into contact with a base plate of the other construction element. When a pressure is applied beyond those stop positions, the hinge connection is disengaged.

Besides the advantage of avoiding "hot spots" upon manufacturing, gaining time and material, the through hole offer additional construction possibilities, i.e. when assembling several construction elements, male legs may be fitted at both sides of the through hole. In particular, upon assembling construction elements in one plane in such a manner that a first construction element is fitted between female member of a second construction element, and one of the male members of the second construction element is fitted between female members of a third construction element, then one of the female members of the first construction element will be spaced off with a distance L from one of the female members of the third construction element, so that a male member of a fourth construction element may be fitted between the latter two female members. These additional construction possibilities may contribute to the stability and diversity of the formed structure. The through holes also offer the possibility to receive a number of accessories, for example carrying an axle for forming a car or holding a string for forming a necklace. The through holes also offer the possibility to disengage construction elements from each other by inserting a lever such as a pen.

It is also possible to assemble female members from different construction elements with each other by providing a pin through the through holes.

The construction element according to FIGS. 3 to 5 has preferably the following dimensions: distance between the female legs L, distance between the male legs L, height of the legs L, length of the base plates 2 and 5 equal to 3L and height of the base plates 2 and 5 equal to L. Consequently, an imaginary square 10 is formed with sides having a length equal to 5L. Thus, the construction element is designed in such a way—male and female members have all the same length, width and height—that the hinges are not only provided for interlocking different elements, but are also such that, when construction elements are engaged, the edges of the legs are touching, leaning and resting on the base plate of the other element. Thus a structure can be given great stability and a great vertical resistance to pressure.

Figure 18:
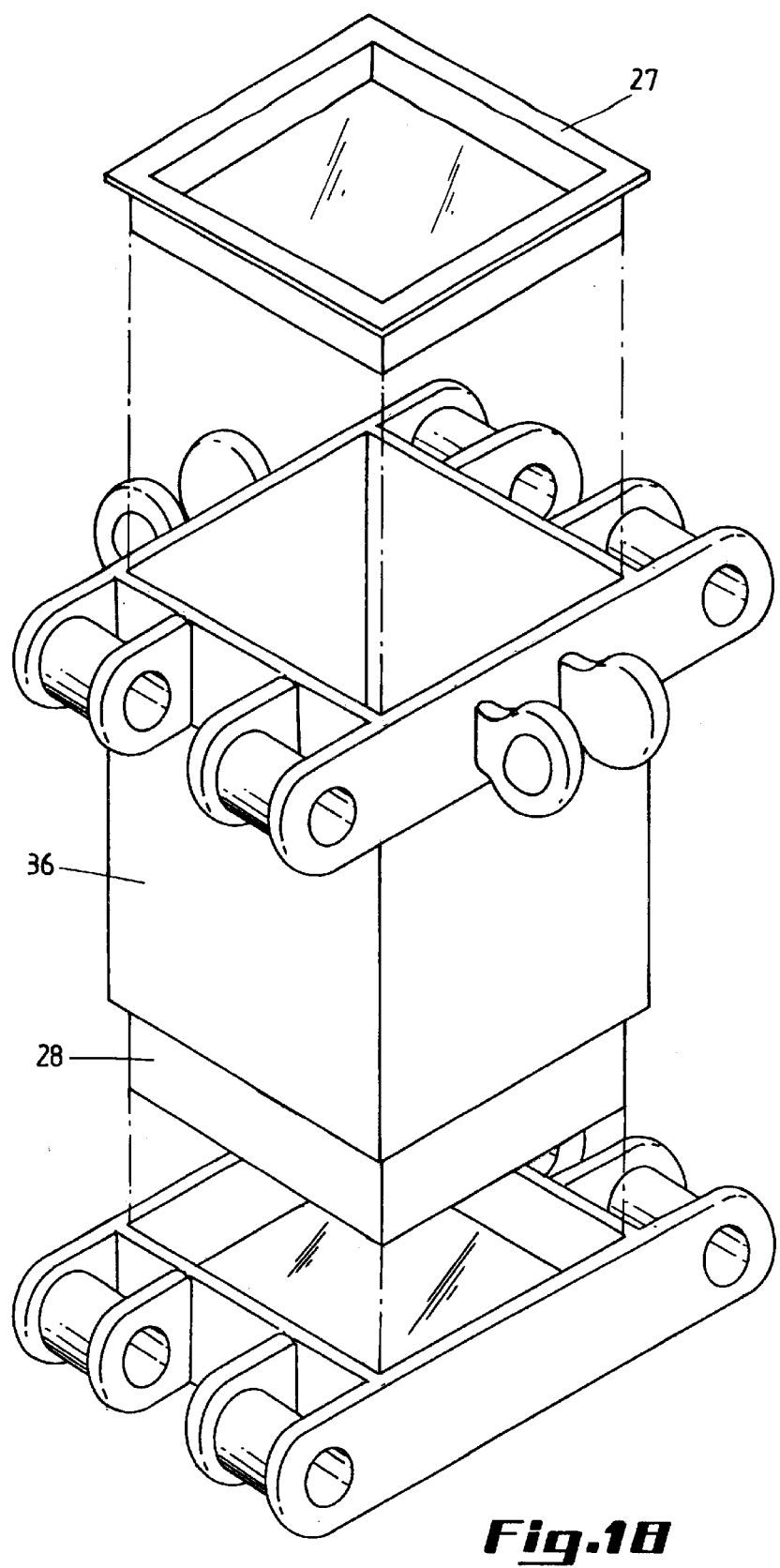
FIG. 18 is a perspective view of a container with male and female members according to the invention.

Preferably the base plates 2 and 5 are connected by a connection plate 11 extending perpendicularly to the base plates 2 and 5, enhancing the strength of the construction element. In this way, a container is also formed. In the embodiment shown in FIGS. 3 to 5, the height of the construction element (shown in FIG. 4) is also equal to L. It is also conceivable to form containers with a larger height in order to increase the volume of the container. FIG. 18 shows a possible embodiment, wherein the bottom portion 28 of the container is dimensioned in order to fit within a construction element of FIG. 3 and wherein assembled within that construction element, the height is equal to 5L so as to correspond with the length of the sides of the imaginary square of FIG. 3. In this way, the container forms an imaginary cube with sides equal to 5L and is compatible with the construction elements of FIGS. 3 to 5 and may therefore be used in connection therewith to form complex structures. The container of FIG. 18 further comprises a cap 27 in order to form a closed object. Such a container may be used for containing objects, goods or liquids. A container can also be formed with a separate conditioned element 36. In other words, the container of FIG. 18 comprises one element 36 in the form of a cube with the hinge connection. According to an alternative, the element 36 is separated into an element with the hinges and a separate element which may be in another material, for example cardboard.

The element of FIGS. 3 to 5 can also receive cardboard elements comprising numbers, letters or images.

The construction element according to the invention may also be used as a cap for a container, for example for a bottle. In this case, a threaded closure element should be provided in the element of FIGS. 3 to 5.

For the same compatibility reasons as explained hereinabove, the square plate used in connection with the construction elements of FIG. 2 should preferably have sides with a length for example equal to 11L, so that three elements of FIG. 3 to 5 linked together may be hingedly fitted to the formed construction with the square plate.

Figure 7:
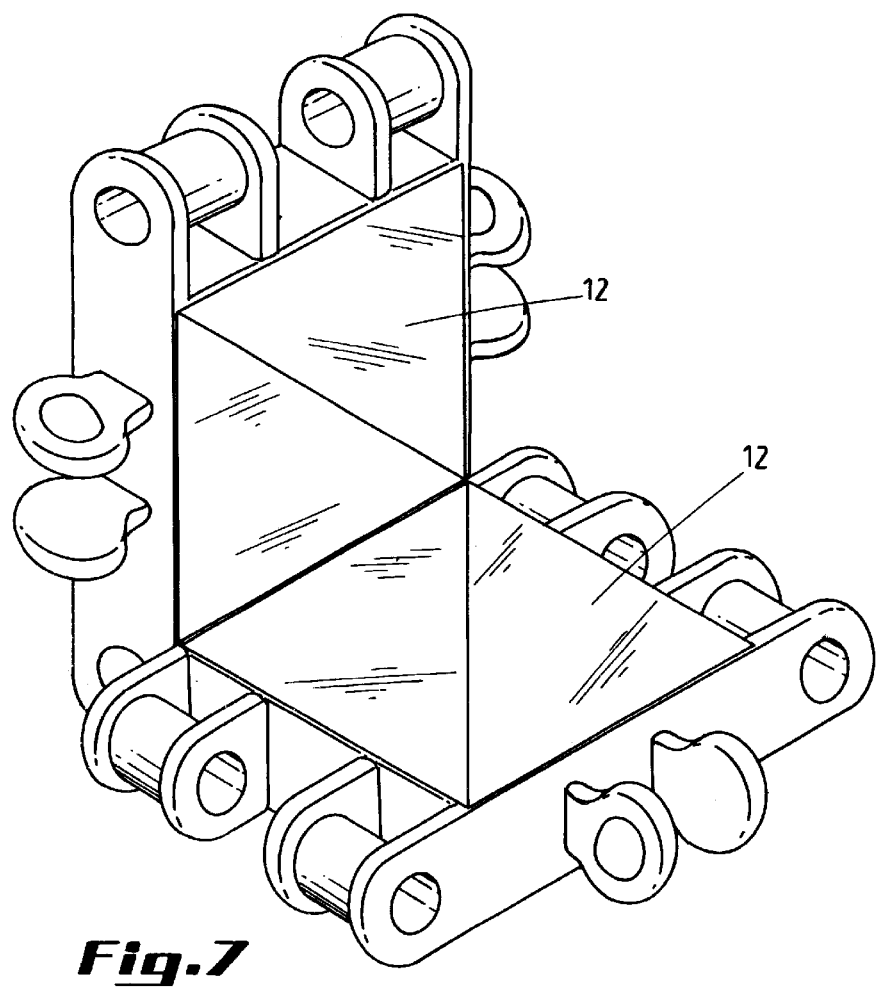
FIG. 7 is a perspective view showing two construction elements according to FIGS. 3 to 5 into which pyramidal elements according to FIG. 6 are fitted.

By using a number of construction elements according to FIGS. 3 to 5, it is possible to form a hollow elongated bar. In order to reinforce the structure, a beam may be fitted into the hollow area for supporting the formed object. FIGS. 6 and 7 show another way to reinforce the structure of the construction elements. A pyramidal element 12 comprises a squared base 13 fitting within the square formed by the base plates 2 and further base plates 5. The height H is essentially equal to ½ of the length of the base plate 2, which is thus equal to 1.5L. The reason why the pyramidal element 12 should have this height will be clear from FIG. 7, showing two construction elements each having a pyramidal element 12 fitted thereon. With six construction elements and six pyramidal elements, a closed cube can be formed.

Figure 8:
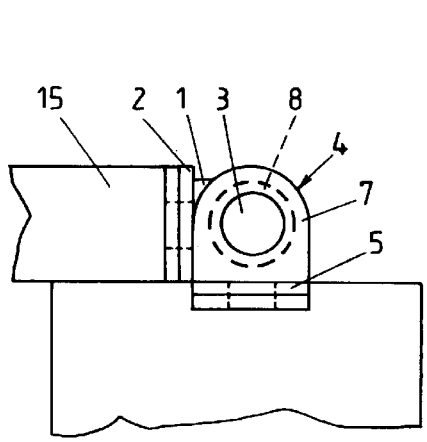
FIG. 8 is a side view of a hinge connection having male and female members according to FIGS. 1 to 5.
Figure 9:
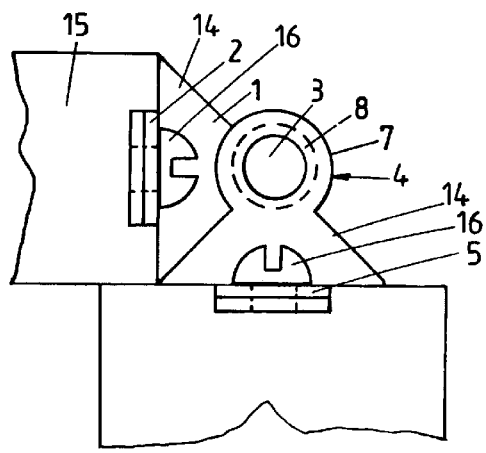
FIG. 9 is a side view of another embodiment of a hinge connection, wherein the axis of the hinge is at a greater distance from its base and wherein the male and female legs comprise an enlarged base for stability purposes.

The hinge connection according to the invention may be used for hingedly connecting plates to each other, such as illustrated in FIGS. 8 to 10. According to the embodiment of FIG. 8, the width of the base plate 2 determines the maximum thickness of one of the plates 15. The embodiment according to FIGS. 9 and 10 enables one to increase this maximum thickness by enlarging the distance of the axis from the hinge from the base plate. This enlarged distance now determines the maximum thickness of one of the plates 15. In FIGS. 9 and 10, the male and female legs 1 and 7 comprise an enlarged base 14 for ensuring stability of the hinge connection. The female legs are connected by a plate 35 for further stability. As can be deduced from FIGS. 8 and 9, plate 15 is two times thicker in FIG. 9 than in FIG. 8, since the width of the enlarged base 14 is two times the width of the base plate 2. As illustrated in FIG. 9, the hinge connection is for example fixed to the plate by means of screws 16.

Referring to FIGS. 11 and 12, there is shown a locking member 17 according to the invention. This locking member comprises a locking leg 18 provided to be placed between the male legs 1, as shown in FIG. 13. A release leg 19 extends perpendicularly to the locking leg 18 and is provided to be gripped by a pair of pincers for facilitating release of the locking member. As shown in FIGS. 11 and 12 there is provided a release leg at both sides of the locking leg. According to an alternative, there is provided only one release leg at only one side of the locking leg.

FIG. 13 further shows another embodiment of the hinge connection according to the invention, wherein the base and further base plates 2 and 5 have a stepped shape, so that different base plates 2 and 5 may be connected adjacent each other by means of screws (not shown) for example. A washer 31 may be provided for the hinge connection at one of the extremities.

Figure 23:
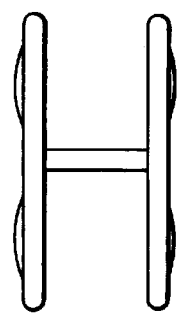
FIG. 23 shows another embodiment of a linking member according to the invention.

In order to enable to connect the intermediary pieces of the female members, there is provided a linking member 20 as illustrated in FIG. 14. The linking member comprises two C shaped curved legs 21 attached to each other. FIG. 23 shows another embodiment of a linking member 20 having the shape of two male members attached to each other. This linking member is provided for being positioned between a pairs of female members from a first element and a pair of female members from another element. A combination of FIGS. 14 and 23 is also conceivable, comprising one C shaped curved leg and one male member attached to each other.

Figure 15:
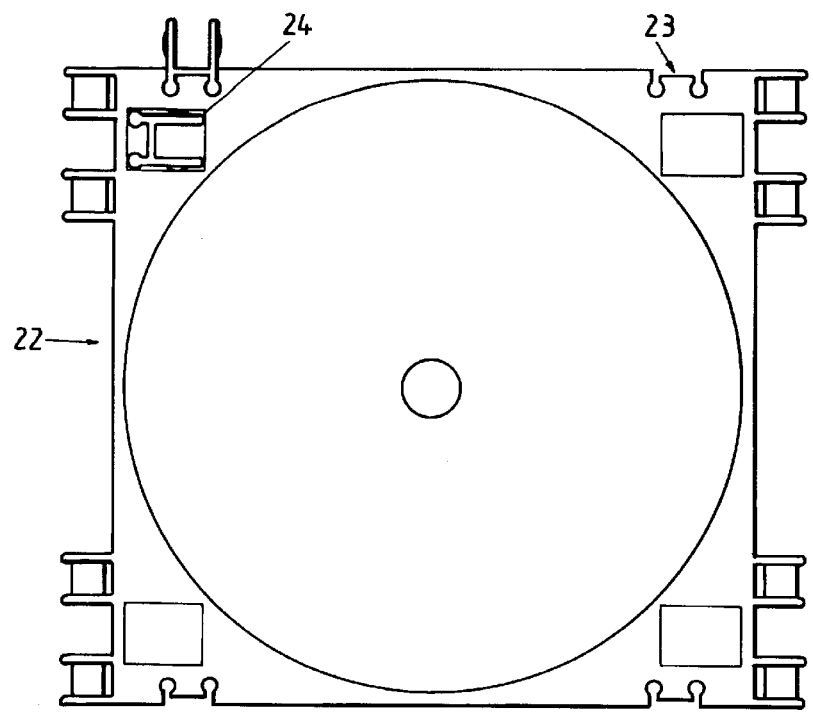
FIG. 15 shows an application of the male and female members in a CD holder box.

The male and female members according to the invention may further be used in a CD holder box 22 as shown in FIG. 15. Two opposite side of the each comprise two pairs of female members at their extremities whereas the other opposite sides comprise notches 23 for receiving releasable male member 24. In FIG. 15, only one releasable male member 24 has been shown in two positions, i.e. the mounted position and a storage position. It will be understood that a CD box contains four releasable male members.

Figure 16:
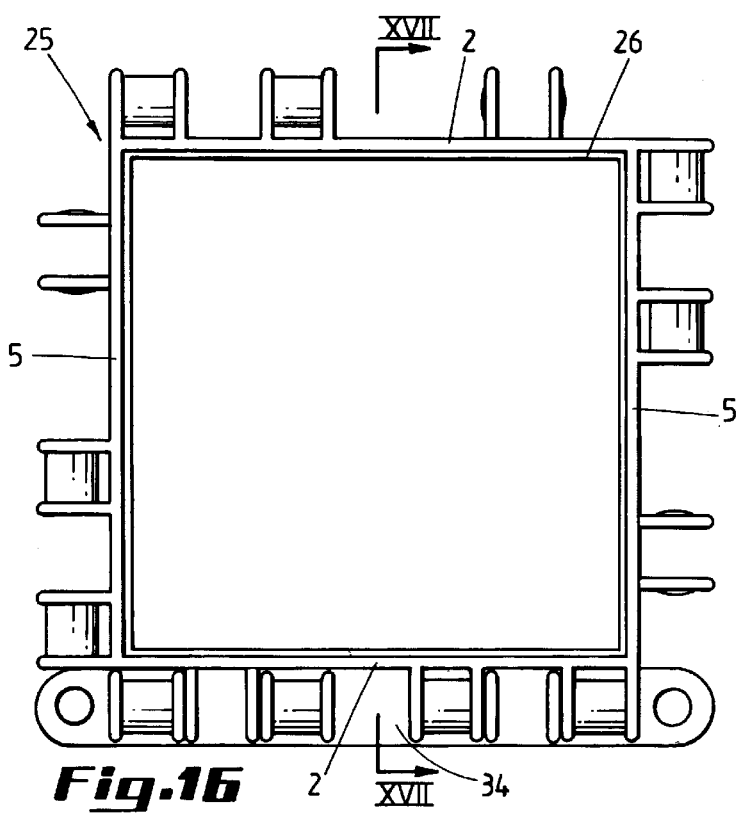
FIG. 16 shows an application of the male and female members in a photograph frame.
Figure 17:
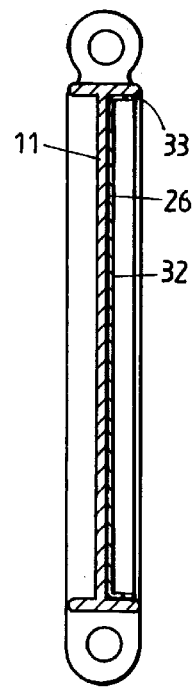
FIG. 17 is a partial cross section according to lines XVII—XVII in FIG. 16.

FIGS. 16 and 17 show another application of the male and female members according to the invention forming a frame 25 for a photograph. Such as in the embodiment of FIGS. 3 to 5, the construction element comprises base plates 2 and 5 connected to each other to form a closed object. The base plates are further connected by a connection plate 11. In order to protect a photograph from dust, a cover 26 of transparent material, for example polystyrene, is provided as illustrated in FIG. 17. The cover 26 is formed by a plate 32 with edges 33. In the position shown in FIG. 17, the plate is in contact with the photograph in order to protect it from dust. In another position, wherein the edges 33 are in contact with the connection plate 11, a closed area is formed which may be used for holding objects. FIG. 16 shows that the frame is held in a vertical position by connecting it to a support member 34 comprising corresponding male and female members. The support member may also be formed by connecting two construction elements of FIGS. 3 to 5 to one another.

Figure 21:
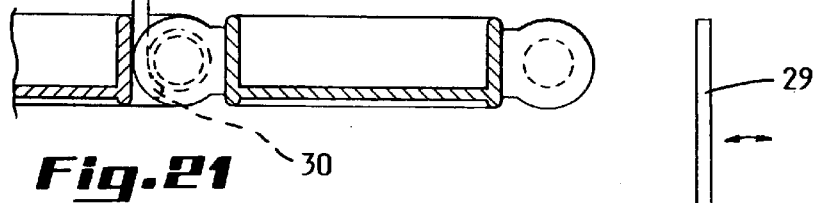
Figure 22:
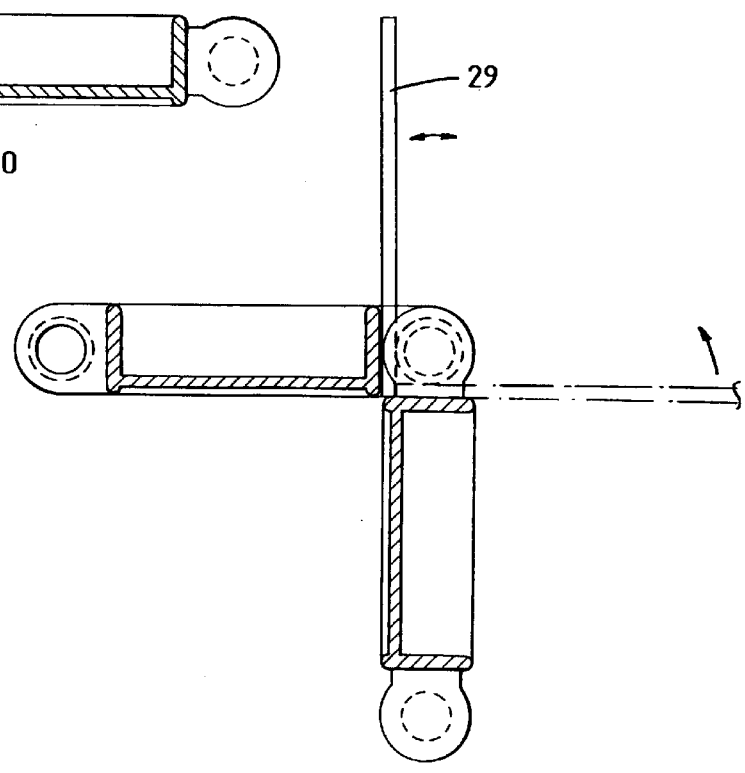
FIG. 22 shows a second preferred embodiment of the tool.

FIGS. 20 to 22 show two embodiments of a tool 29 in connection with the construction elements of FIGS. 3 to 5. The tool 29 comprises two spaced apart lever legs. Each lever leg is provided for being positioned between two female legs of a female member for tilting said female member out of said male member, as shown in FIGS. 20 and 22 by the arrows. If the tool comprises a curved free end 30 as shown in FIGS. 20 and 21, the female member can also be pulled out of the male member, as indicated by the arrow in FIG. 21.

What is claimed is:
1. A hinge connection comprising:
  a base plate;
  a male member applied on said base plate,
  a further base plate;
  a pair of female members applied on said further base plate;
  said male member having protrusions provided to be hingedly and resiliently fitted between said pair of female members;
  said male member being formed by two parallel male legs with an open space between the male legs, each leg comprising one of said protrusions;
  each of said female members comprising a through hole for engaging one of said protrusions; and
  each of said female members being formed by two parallel female legs connected by an intermediary piece mounted offset from said further base plate; and
  said through hole extends through said female legs and said intermediary piece.

2. The hinge connection according to claim 1, wherein said intermediary pieces are cylindrical pieces and said through holes and protrusions are cylindrical.

3. The hinge connection according to claim 1, wherein said male and female members are provided with rounded free ends.

4. The hinge connection according to claim 1, wherein said male and female legs comprise rounded borders.

5. The hinge connection according to claim 1, wherein said female legs comprise a base enlarged with respect to said base plate.

6. The hinge connection according to claim 1, further comprising a locking member for locking the connection of said male member to said female member, wherein said locking member comprises a locking leg provided to be placed between said male legs and a release leg extending essentially perpendicularly to said locking leg.

7. The hinge connection according to claim 1, further comprising a linking member for connecting a first female member with a second female member.

8. A construction element comprising
  at least one base plate with at least one male member,
  at least one further base plate with a first pair of female members,
  the distance between said female members being substantially equal to the width of said male member,
  said male member having protrusions provided to be hingedly and resiliently fitted between a second pair of female members of a second construction element,
  said first pair of female members being provided to hingedly and resiliently engage a third male member of a third construction element,
  said first male member being formed by two parallel male legs with an open space between the male legs, each leg comprising one of said protrusions,
  each of said first pair of female members being formed by two parallel female legs connected by an intermediary piece which is mounted offset from said further base plate, and
  each of said first pair of female members comprises a through hole which extends through said female legs and said intermediary piece.

9. The construction element according to claim 8, comprising at least three base plates forming a closed area, wherein said base plates are connected by a connection plate extending in a plane perpendicular to said base plates.

10. The construction element according to claim 8, comprising two parallel base plates and two further parallel base plates forming together a square, wherein the two base plates each comprise said male legs applied symmetrically with respect to the middle of the base plate and wherein the two further base plates each comprise said first pair of female members, each female member of said first pair extending at an extremity of the further base plate in such a manner that one of said female legs extends in prolongation from an extremity of one of said base plates.

11. The construction element according to claim 10, wherein the female legs are spaced from each other with a distance equal to L, the male legs with a distance equal to L, the legs having a height equal to L, the base plates having a length equal to 3L and the base plates having a height equal to L.

12. The construction element according to claim 10, further comprising a pyramidal member having a squared base fitting in said square and a height essentially equal to ½ of the length of the base plates.

13. A CD holder box comprising said female and male members according to claim 1.

14. A photograph frame comprising said female and male members according to claim 1, the photograph frame further comprising a cover of transparent material provided for protecting the photograph from dust.

* * * * *